US009741180B2

(12) United States Patent
Mungo

(10) Patent No.: US 9,741,180 B2
(45) Date of Patent: Aug. 22, 2017

(54) CLOUD-BASED ADDRESS PROCESSING

(75) Inventor: Joseph C. Mungo, Coppell, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 1103 days.

(21) Appl. No.: 13/310,353

(22) Filed: Dec. 2, 2011

(65) Prior Publication Data

US 2013/0044350 A1 Feb. 21, 2013

Related U.S. Application Data

(60) Provisional application No. 61/523,612, filed on Aug. 15, 2011.

(51) Int. Cl.
*G06F 3/12* (2006.01)
*G07B 17/00* (2006.01)

(52) U.S. Cl.
CPC .................. *G07B 17/00435* (2013.01); *G07B 2017/00451* (2013.01)

(58) Field of Classification Search
None
See application file for complete search history.

(56) References Cited

U.S. PATENT DOCUMENTS

| | | | | |
|---|---|---|---|---|
| 5,422,821 | A | 6/1995 | Allen | |
| 5,703,783 | A | 12/1997 | Allen | |
| 2008/0269946 | A1* | 10/2008 | Kiani et al. | 700/219 |
| 2009/0157470 | A1* | 6/2009 | Rathbun et al. | 705/10 |
| 2010/0281529 | A1* | 11/2010 | Krause et al. | 726/7 |

OTHER PUBLICATIONS

United States Postal Service, Postal Automated Redirection System (PARS), (59 pages).
Siemens: Industrial Solutions and Services, PARS System Level Training, Mar. 2006, (139 pages).
Siemens: Siemens ElectroCom, CARS PCOA Directory Generation, Mar. 2001, (17 pages).

* cited by examiner

*Primary Examiner* — Idowu O Osifade

(57) ABSTRACT

Mail processing systems and methods. A method includes receiving a plurality of mailpieces in the mail processing system and associating a unique identifier with each of the plurality of mailpieces. The method includes obtaining destination address information for each of the plurality of mailpieces and comparing the destination address information with a potential move table to determine destination addresses for which there is a potential change of address. The method includes sending the destination address information to a change of address (COA) server and receiving COA results from the COA server. The method includes printing destination information on each mailpiece according to the COA results.

20 Claims, 3 Drawing Sheets

CLOUD-BASED ADDRESS PROCESSING

CROSS-REFERENCE TO OTHER APPLICATIONS

This application claims the benefit of the filing date of U.S. Provisional Patent Application No. 61/523,612, filed Aug. 15, 2011, which is hereby incorporated by reference.

TECHNICAL FIELD

The present disclosure is directed, in general, to systems and methods for managing mailing addresses.

BACKGROUND OF THE DISCLOSURE

Improved address processing systems are desirable.

SUMMARY OF THE DISCLOSURE

Various embodiments include methods and systems for mail processing. A method includes receiving a plurality of mailpieces in the mail processing system and associating a unique identifier with each of the plurality of mailpieces. The method includes obtaining destination address information for each of the plurality of mailpieces and comparing the destination address information with a potential move table to determine destination addresses for which there is a potential change of address. The method includes sending the destination address information to a change of address (COA) server and receiving COA results from the COA server. The method includes printing destination information on each mailpiece according to the COA results.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
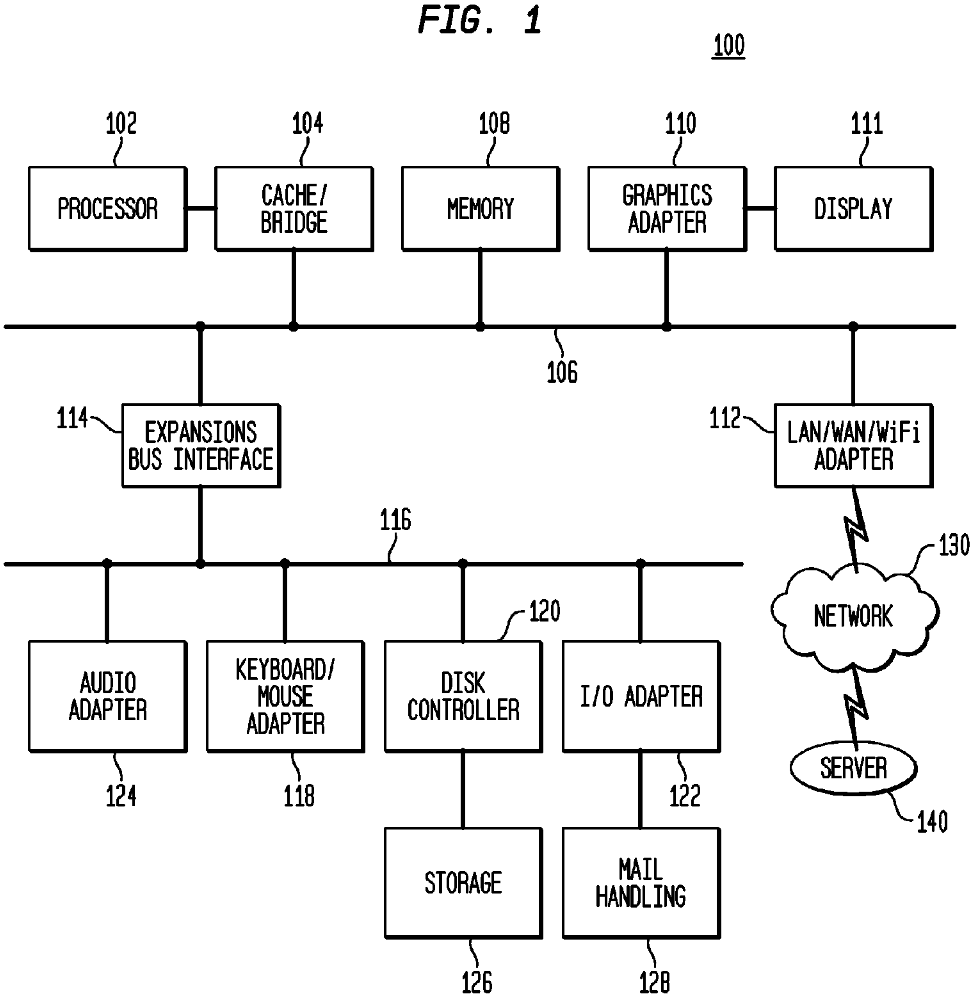
FIG. 1 depicts a Hock diagram of a data processing system 100 in which an embodiment can be implemented, for example, as a mail processing system configured to perform processes as described herein.
Figure 2:
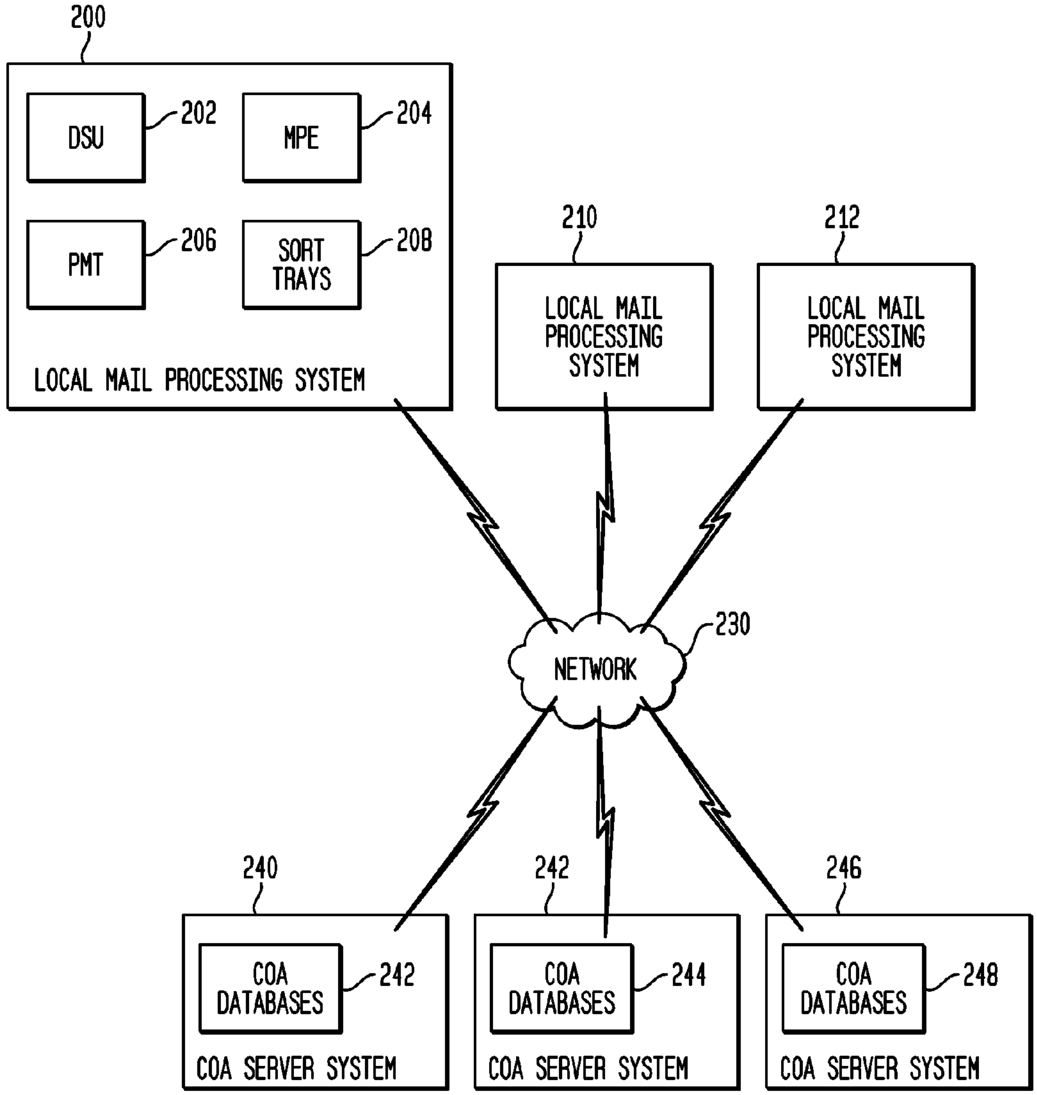
FIG. 2 illustrates a simplified diagram of an architecture in accordance with disclosed embodiments.
Figure 3:
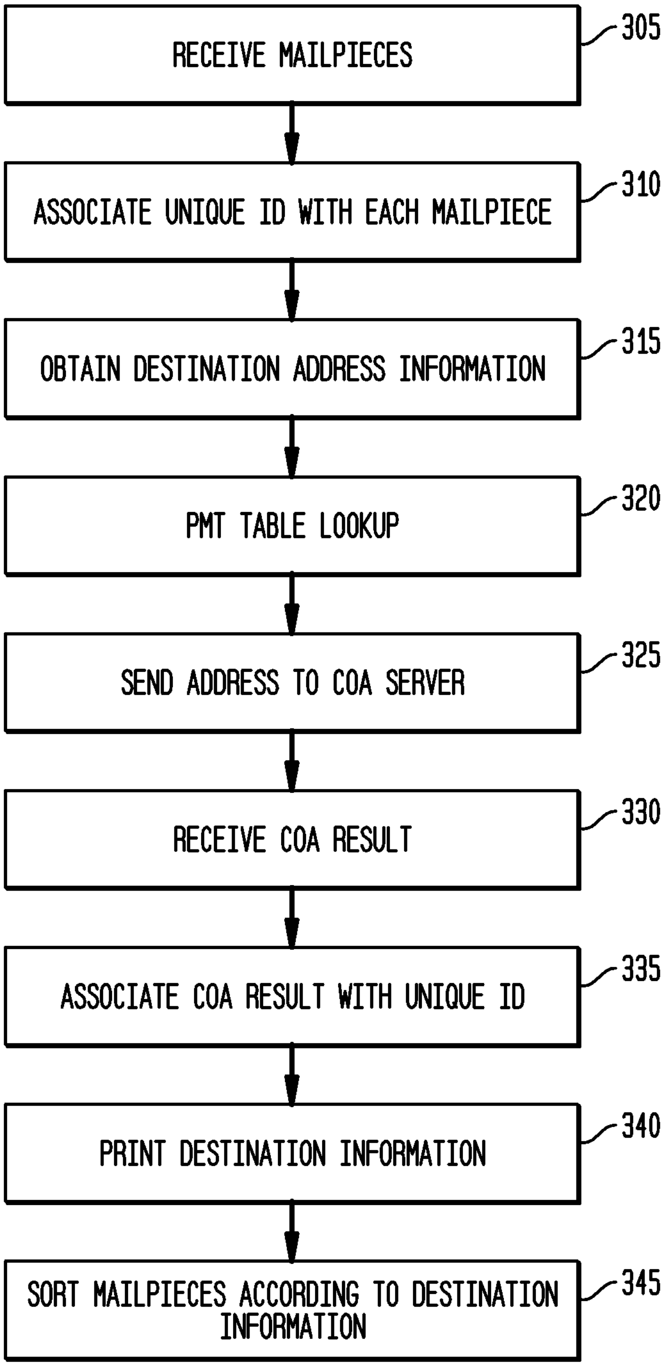
FIG. 3 depicts a flowchart of a process in accordance with disclosed embodiments.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Disclosed embodiments provide advantages in address processing, for postal systems, private couriers, and preprocessors.

The United States Postal Service (USPS) has decided phase out their "USPS FASTforward" (FF) product. FF is a change of address (COA) product targeted for the commercial presort market. The USPS has stated that the replacement product to FF will be based upon USPS NCOALink technology. The USPS NCOALink product is a dataset of approximately 160 million permanent COA records consisting of the names and addresses of individuals, families, and businesses who have filed a change-of-address with the USPS. The USPS delivers a class of products called "MPE NCOA-Link", where MPE stands for mail processing equipment.

The USPS has chosen to implement an annual license fee for MPE NCOA-Link that is significantly higher than the current FE license. This will negatively impact the presort market. In fact, for low-throughput sorters or manual sorters, the current license fee was too high and the new license fee is even worse. These users will desire alternative methods of meeting the USPS move update requirement.

The USPS FF product was introduced in 1997, and until recently, was the only commercial way to perform inline COA matching and updating. Although FF basically worked as designed, its performance and operation was less than optimal due to the design architecture as well as the advancing age of the technology.

The USPS FF product received weekly COA updates directly from the USPS. These updates were distributed via CD or DVD via the mail. The loading process was time intensive and intrusive to operations. The USPS FF product provided minimal reports, and supporting it was difficult because it provided no diagnostic functionality.

Disclosed embodiments provide systems and methods for improved processing and management of COA information.

FIG. 1 depicts a block diagram of a data processing system 100 in which an embodiment can be implemented, for example, as a mail processing system that can process mail with changes of address, configured to perform processes as described herein. The data processing system 100 includes a processor 102 connected to a level two cache/bridge 104, which is connected in turn to a local system bus 106. The local system bus 106 may be, for example, a peripheral component interconnect (PCI) architecture bus. Also connected to the local system bus 106 in the depicted example are a main memory 108 and a graphics adapter 110. The graphics adapter 110 may be connected to a display 111.

Other peripherals, such as a local area network (LAN)/Wide Area Network/Wireless (e.g. WiFi) adapter 112, may also be connected to the local system bus 106. An expansion bus interface 114 connects the local system bus 106 to an input/output (I/O) bus 116. The I/O bus 116 is connected to a keyboard/mouse adapter 118, a disk controller 120, and an I/O adapter 122. The disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives, and compact disk read only memories (CD-ROMs) or digital versatile disks (DVDs), and other known optical, electrical, or magnetic storage devices. The I/O adapter 122 can be connected to any number of input/output devices, including in particular mail processing or handling equipment 128 that is capable of performing other mail processing functions, including transporting, sorting, scanning, imaging, and other processes that may be useful for processing parcels, letters, packages, flats, and other mail pieces, all referred to as "mail items" herein, whether processed by postal services or private courier or delivery services.

Also connected to the I/O bus 116 in the example shown is an audio adapter 124. The keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. In some embodiments, multiple data processing systems may be connected and configured to cooperatively perform the processing described herein. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interpiece simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

The LAN/WAN/Wireless adapter 112 can be connected to a network 130 (not a part of data processing system 100), which can be any public or private data processing system network or combination of networks, as known to those of skill in the art, including the Internet. The data processing system 100 can communicate over the network 130 with a server system 140, which is also not part of the data processing system 100, but can be implemented, for example, as a separate data processing system 100.

Disclosed embodiments include systems and methods for COA processing and for connecting and communicating with COA databases. In particular, disclosed embodiments can use cloud-based processing. In particular implementations, a mail processing system such as data processing system 100 can include other mail-processing hardware, including mail sorting, transport, scanning, and printing equipment, to perform the functions described herein, collectively shown as mail handling equipment 128 connected to I/O adapter 122. Further, a separate data processing system 100, acting as server system 140 described above, can perform COA lookup functions in a "cloud" architecture, and can be located remotely from the local mail processing system that is actively handling the mailpieces.

Generally, in a cloud-based design, servers such as server system 140 are located remotely in a data center and are accessed over the Internet. Access is either transactional or batch-based. Disclosed embodiments overcome latency issues associated with communications over a wide area network (WAN) such as the Internet.

One problem with prior address-processing systems was too many timeouts; that is, not returning a result before the sorter ink jet decision even though the system was local to the mail transport system. This latency problem can be even worse over WANs, such as the Internet, because communications take longer and are far from deterministic.

Disclosed embodiments provide distinct technical advantages over prior systems. Various embodiments can split the COA operational steps into two passes from one pass, assign a unique identifier to each mailpiece, use a potential move table (PMT) on the local mail processing system, and use a decision results database to finalize the operation in the second pass. Data such as the PMT and decision results database can be stored, for example, in memory 108 or storage 126.

Disclosed embodiments break the traditional COA processing concept from a single-pass inline process performed during first-pass operations into an operation performed jointly between both first pass and a secondary pass. COA processing steps at a local mail processing center can include camera image acquisition, optical character recognition (OCR) lookup to obtain a result, COA lookup to obtain a result, barcode print, and COA line print.

According to embodiments disclosed herein, during first-pass operations, the system performs camera image acquisition and OCR lookup to obtain a result. Then, two other steps can be included in first pass operations.

To facilitate two-pass operations, a unique identifier is created, assigned, or otherwise associated with each mailpiece. Some examples of unique identifiers include: applying a barcode ID tag on either the front or rear of the mailpiece, such as a USPS fluorescent orange ID tag, using the name, address, and ZIP code on the mailpiece (obtained from the OCR) as a unique identifier, or using another unique identifier such as the Siemens FingerPrint technology.

FIG. 2 illustrates a simplified diagram of an architecture in accordance with disclosed embodiments. Shown here is a local mail processing system 200, which can be implemented as a mail processing system 100 as shown in FIG. 1, which also includes other elements as described below. Local mail processing system 200 communicates over network 230 with COA server system 240, which maintains one or more COA databases 242. Additional local mail processing systems 210 and 212 are shown, omitting the details illustrated for local mail processing system 200, and each can function as described for local mail processing system 200. While three local mail processing systems are shown in this example, those of skill in the art will recognize that the techniques described herein apply to any number of local mail processing systems, each of which can be located geographically separate from each other.

The local mail processing system 200 maintains mail processing equipment (MPE) 204, and other elements as shown in the example of FIG. 1. The local mail processing system 200 can also maintain a PMT table 206. According to various embodiments, a PMT table can be implemented as a software table associated with a COA database 242 that contains a list of potential moves (changes of address) for one or more 11-digit ZIP codes. For example, a zero-zero table in a NCOA-Link system can be used as a PMT table.

A copy of the PMT table 206 can be maintained on each mail processing system and can be accessed by that system. The 11-digit ZIP code identified by the OCR, for example, can be used as an index into the PMT table 206. Mailpieces without a PMT match are processed as regular mail during the first pass. They can be either "quick-killed" or sorted and staged for second pass operations by sorting them into sort trays 208.

Mailpieces with PMT table matches will be tagged as "PMT mailpieces" or "PMT mail," as mail for which there was a potential change of address for the addressee. PMT mailpieces will be directed to a special pocket for secondary pass operations. Lastly, for PMT table matches, the name and address data associated with PMT mailpiece will be sent to the COA server system 240 for a COA lookup in COA databases 242. Additional COA server systems 242 and 246 are shown, with respective COA databases 244 and 248, and each can function as described for COA system 240. While three COA server systems are shown in this example, those of skill in the art will recognize that the techniques described herein apply to any number of COA server systems, each of which can be located geographically separate from each other. In particular, each of the plurality of local mail processing systems can communicate with one or more of the COA server systems over network 230. Network 230 can be any combination of public or private computer networking systems, including the Internet.

PMT mail may be rerun once all of the first pass mail has been processed. This typically occurs when all of the first pass mail has been processed (but while still in first pass) or during an actual second pass. One benefit of processing PMT mail at the end of first pass is that the finalized sort data associated with the PMI mail can be consolidated with the non-PMT first pass mail. This leads to better organized sort data for presort qualification and generation of the secondary sort plans. This is known as "paying off of plan".

Postponing the PMT mail to second pass operations just means that the presorter should adjust the first pass numbers to accommodate the changing of ZIP code densities due to the address being changed. This method of accounting is known as "paying off of actuals". Both accounting methods are used within the USPS.

Various embodiments can perform the COA processing described herein either during a single (first) pass or during a multi-pass process.

According to disclosed embodiments, the local mail processing system can use a special sort mode for PMT mail processing. This mode enables the unique identifier reader, the barcode print, and the COA line print. The unique identifier created/assigned in first pass must be received or recreated. This can include reading a barcode ID using an ID tag barcode reader or using the name, address, and ZIP code, or using FingerPrint to acquire a unique identifier.

The local mail processing system 200 can include a decision storage unit (or DSU) 202. The DSU 202 can be implemented using a specialized controller or can be implemented as software running on the local mail processing system 200. DSU 202 can function as a lookup table that correlates PMT unique identifiers to COA results returned from the COA databases 242 on COA server system 240. Each table entry will indicate whether or not a COA was found for a mailpiece.

For a change of address, the 11-digit barcode and COA line returned from the COA server system 240 is entered in the table. The DSU 202 can also contain a status indicator screen for the operator to verify if PMT mail is ready to run. That is, the screen informs the operator that the results for a run have been processed and returned.

The mail processing system 200 can then process the PMT mail in the second pass. This can include putting the mail processing system 200 into a PMT operational mode.

To process the PMT mail, the mail processing system 200 acquires the unique identifier for each mailpiece. The unique ID is used as a lookup into the DSU table 202, If no COA match is found, then the original ZIP code correlated to the address in the address block is printed on the mailpiece, such as in a "barcode clear" zone, and the mailpiece is sorted to the original ZIP code.

If a COA match is found, then the new ZIP code (received from the COA server) is printed on the mailpiece and a COA line is printed above the barcode. The mailpiece is then sorted to the new ZIP code.

FIG. 3 depicts a flowchart of a process in accordance with disclosed embodiments. Such a process can be performed, for example, by one or more local mail processing systems (referred to generically as "the system" below) in communication with a change of address server system. Note that detailed steps of conventional processes such as imaging, sorting, and others are omitted as they are well known to those of skill in the art.

The system receives a plurality of mailpieces for processing (step 305).

The system associates a respective unique identifier with each mailpiece (step 310). The unique ID can be determined, created, or associated using any of the processes described above, or otherwise using techniques known to those of skill in the art.

The system obtains destination address information for each mailpiece (step 315). This can be obtained, for example, by performing imaging and OCR processes on each mailpiece. Destination address information can include such information as the recipient name, address, ZIP code, and other information.

For each mailpiece, the system compares the destination address information with a potential move table that indicates destination addresses for which there is a potential change of address (step 320). This PMT table lookup identifies mailpieces with addresses in the PMT that may require additional processing as described herein. Other mailpieces are processed conventionally, and are not further described in this example.

For each mailpiece for which the destination address information corresponded to an address in the potential move table (the PMT mailpieces), the system sends the destination address information to a change of address (COA) server that maintains a COA database (step 325). The COA server can be geographically remote from the system. The COA database can include, for example, address changes for specific recipients, and can be accessed without waiting for a "hard" media distribution of the changes.

The system receives a COA result for each PMT mailpiece from the COA server (step 330).

The system associates the COA results with the respective mailpiece unique identifiers (step 335).

The system prints destination information on each mailpiece according to the COA results and the unique identifiers (step 340). Printing can include direct printing on the mailpiece, such as by inkjet printer or otherwise, printing and applying a label to the mail piece, or other appropriate manner of marking the mailpiece with destination information. The destination information can include a barcode.

If the COA result for a mailpiece indicated that there was a change of address corresponding to the destination address information, then the printed destination information can include a barcode or other indicia corresponding to address data received from the COA server as part of the COA result, and can include a "change of address" line, if the COA result for the mailpiece does not indicate that there was a change of address corresponding to the destination address information, then the printed destination information can include a barcode or other indicia corresponding to the original destination address information.

The system can thereafter sort the mailpieces according to the printed destination information (step 345).

In some embodiments, some steps (such as steps 305-320) can be performed in a first processing pass, and other steps (such as steps 325-340) can be performed in a second processing pass. In some specific embodiments, sending the destination address information to a COA server, receiving COA results from the COA server, and printing destination information on each mailpiece according to the COA results are performed by the mail processing system in a second pass while the mail processing system is in a second operational mode. In other specific embodiments, these steps are performed by the mail processing system in a single pass operational mode.

It is important to note that while the disclosure includes a description in the context of a fully functional system, those skilled in the art will appreciate that at least portions of the mechanism of the present disclosure are capable of being distributed in the form of a computer-executable instructions contained within a machine-usable, computer-usable, or computer-readable medium in any of a variety of forms to cause a system to perform processes as disclosed herein, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto.

Although an exemplary embodiment of the present disclosure has been described in detail, those skilled in the art will understand that various changes, substitutions, variations, and improvements disclosed herein may be made without departing from the spirit and scope of the disclosure in its broadest form. In the processes described above, various steps may be performed sequentially, concurrently, in a different order, or omitted, unless specifically described otherwise.

None of the description in the present application should be read as implying that any particular element, step, or function is an essential element which must be included in the claim scope: the scope of patented subject matter is defined only by the allowed claim. Moreover, none of these claims are intended to invoke paragraph six of 35 USC §112 unless the exact words "means for" are followed by a participle.

What is claimed is:

1. A method for processing mail, performed by a mail processing system, comprising:

receiving a plurality of mailpieces in the mail processing system;

associating a unique identifier with each of the plurality of mailpieces;

obtaining destination address information for each of the plurality of mailpieces;

comparing the destination address information with a potential move table to determine destination addresses for which there is a potential change of address;

sending the destination address information including a recipient name to a change of address (COA) server;

receiving COA results from the COA server; and printing destination information on each mailpiece according to the COA results, including correlating the COA results to the unique identifiers.

2. The method of claim 1, wherein the printed destination information includes an indicia corresponding to address data received from the COA server as part of the COA result.

3. The method of claim 1, further sorting the plurality of mailpieces according to the printed destination information.

4. The method of claim 1, wherein the printed destination information includes a change of address line.

5. The method of claim 1, wherein the COA server maintains a COA database of address changes for specific recipients.

6. The method of claim 1, wherein any destination address information that is not found in the potential move table is not sent to the COA server.

7. The method of claim 1, wherein sending the destination address information to a change of address (COA) server, receiving COA results from the COA server, and printing destination information on each mailpiece according to the COA results are performed by the mail processing system in a second pass while the mail processing system is in a second operational mode.

8. The method of claim 1, wherein sending the destination address information to a change of address (COA) server, receiving COA results from the COA server, and printing destination information on each mailpiece according to the COA results are performed by the mail processing system in a single pass operational mode.

9. A mail processing system, comprising:

a processor;

a memory connected to be accessed by the processor; and mail handling equipment connected to be controlled by the processor, the mail processing system configured to receive a plurality of mailpieces;

associate a unique identifier with each of the plurality of mailpieces;

obtain destination address information for each of the plurality of mailpieces;

compare the destination address information with a potential move table to determine destination addresses for which there is a potential change of address;

send the destination address information including a recipient name to a change of address (COA) server;

receive COA results from the COA server; and print destination information on each mailpiece according to the COA results, including correlating the COA results to the unique identifiers.

10. The mail processing system of claim 9, wherein the printed destination information includes an indicia corresponding to address data received from the COA server as part of the COA result.

11. The mail processing system of claim 9, further configured to sort the plurality of mailpieces according to the printed destination information.

12. The mail processing system of claim 9, wherein the printed destination information includes a change of address line.

13. The mail processing system of claim 9, wherein the COA server maintains a COA database of address changes for specific recipients.

14. The mail processing system of claim 9, wherein any destination address information that is not found in the potential move table is not sent to the COA server.

15. The mail processing system of claim 9, wherein sending the destination address information to a change of address (COA) server, receiving COA results from the COA server, and printing destination information on each mailpiece according to the COA results are performed in a second pass while the mail processing system is in a second operational mode.

16. The mail processing system of claim 9, wherein sending the destination address information to a change of address (COA) server, receiving COA results from the COA server, and printing destination information on each mailpiece according to the COA results are performed in a single pass operational mode.

17. A non-transitory machine-readable medium encoded with instructions that, when executed, cause a mail processing system to:

receive a plurality of mailpieces;

associate a unique identifier with each of the plurality of mailpieces;

obtain destination address information for each of the plurality of mailpieces;

compare the destination address information with a potential move table to determine destination addresses for which there is a potential change of address;

send the destination address information including a recipient name to a change of address (COA) server;

receive COA results from the COA server; and print destination information on each mailpiece according to the COA results, including correlating the COA results to the unique identifiers.

18. The machine-readable medium of claim 17, wherein the printed destination information includes an indicia corresponding to address data received from the COA server as part of the COA result.

19. The machine-readable medium of claim 17, further encoded with instructions that, when executed, cause the mail processing system to sort the plurality of mailpieces according to the printed destination information.

20. The machine-readable medium of claim 17, wherein the printed destination information includes a change of address line.

* * * * *